(12) United States Patent
Gronenthal et al.

(10) Patent No.: US 10,532,634 B2
(45) Date of Patent: Jan. 14, 2020

(54) VEHICLE WINDSCREENS FOR ENHANCED VISIBILITY

(71) Applicant: Faraday&Future Inc., Gardena, CA (US)

(72) Inventors: Nicholas Max Gronenthal, Los Angeles, CA (US); Nicholas Clyde Bennett, Los Angeles, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 0 days.

(21) Appl. No.: 15/662,636

(22) Filed: Jul. 28, 2017

(65) Prior Publication Data

US 2018/0194202 A1    Jul. 12, 2018

Related U.S. Application Data

(60) Provisional application No. 62/368,901, filed on Jul. 29, 2016.

(51) Int. Cl.
*B60J 1/00*  (2006.01)
*B60J 1/02*  (2006.01)
*B60R 1/00*  (2006.01)

(52) U.S. Cl.
CPC ............... *B60J 1/008* (2013.01); *B60J 1/007* (2013.01); *B60J 1/02* (2013.01); *B60R 1/001* (2013.01)

(58) Field of Classification Search
CPC .. B60R 1/001; B60J 1/008; B60J 1/007; B60J 1/02
See application file for complete search history.

(56) References Cited

U.S. PATENT DOCUMENTS 1,631,046 A  *  5/1927  McCullough  ............. B60J 1/02
                                              296/96.12

* cited by examiner

*Primary Examiner* — D Glenn Dayoan
*Assistant Examiner* — Melissa Ann Bonifazi
(74) *Attorney, Agent, or Firm* — Veros Legal Solutions, LLP

(57) ABSTRACT

A vehicle windscreen assembly includes a first windscreen at a front section of a vehicle and a second windscreen positioned beneath and at an angled position with the first windscreen. The second windscreen substantially reduces a driver's blind spot area in front of the vehicle.

18 Claims, 4 Drawing Sheets

VEHICLE WINDSCREENS FOR ENHANCED VISIBILITY

CROSS-REFERENCE TO RELATED APPLICATIONS

This application claims the benefit of U.S. Provisional Application No. 62/368,901, filed Jul. 29, 2016, the entirety of which is hereby incorporated by reference.

TECHNICAL FIELD

The disclosed technology relates to vehicle windscreens. More specifically, the present invention relates to vehicle windscreens configured to enhance the visibility of the road and terrain for a driver of the vehicle.

BACKGROUND

A driver's visibility and sweeping viewpoint of the road and terrain directly ahead is restricted and limited by the perimeter and boundaries of the windscreen placed in front of the driver, also referred to herein as the primary windscreen. In other words, a wider windscreen allows the driver to have a greater vantage viewpoint and general overall visibility of the road while operating the vehicle, further allowing the driver to have a greater assessment of the road conditions ahead.

While having an expanded and far-reaching view of the road ahead is important for the driver to assess road and traffic conditions, also important is the driver's visibility immediately in front of the vehicle. However, the area immediately front of the vehicle is often characterized as a front blind spot, where areas immediately in front of the vehicle cannot be observed by the driver sitting in the driver's seat. Blind spots present a hidden and ongoing danger when the driver is unable to see objects or people directly in the path of the moving vehicle.

However, there are currently no vehicle windscreens that allow a driver to have a greater vantage viewpoint of the areas immediately in front of the vehicle in order to eliminate or alleviate the front blind spot. Because having the greatest viewpoint of the road and terrain ahead, both near and far, allows a driver to manage safer driving conditions, eliminating or alleviating the front blind spot of vehicles significantly improves driver safety. As such, there currently is a need for vehicles with windscreens that eliminate or alleviate front blind spots so that the areas immediately in front of the vehicles are viewable to the drivers operating the moving vehicles.

SUMMARY

In one aspect, the present disclosure is directed to a vehicle windscreen assembly with two separate windscreens. According to some embodiments, the vehicle windscreen assembly includes a first windscreen at a front section of the vehicle and a second windscreen positioned beneath and at an angled position with the first windscreen. The second windscreen substantially reduces a driver's blind spot area in front of the vehicle.

According to some other embodiments, the vehicle windscreen assembly includes a first windscreen at a front section of a vehicle, a second windscreen positioned beneath the first windscreen, and a frame structure positioned between the first windscreen and the second windscreen to support and securely hold the first windscreen and the second windscreen. The second windscreen reduces a driver's blind spot area in front of the vehicle.

In another aspect, the present disclosure is directed to a vehicle. According to some embodiments, the vehicle includes a first windscreen at a front section of the vehicle, a second windscreen positioned beneath the first windscreen, and a frame structure positioned between the first windscreen and the second windscreen to support and securely hold the first windscreen and the second windscreen. The second windscreen reduces a driver's blind spot area in front of the vehicle. In some embodiments, the vehicle is an electric vehicle.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

The following description is not to be taken in a limiting sense, but is made merely for the purpose of describing the general principles of the disclosed embodiments. The present embodiments address the problems described in the background while also addressing other additional problems as will be seen from the following detailed description. Numerous specific details are set forth to provide a full understanding of various aspects of the subject disclosure. It will be apparent, however, to one ordinarily skilled in the art that various aspects of the subject disclosure may be practiced without some of these specific details. In other instances, well-known structures and techniques have not been shown in detail to avoid unnecessarily obscuring the subject disclosure.

Some embodiments of the disclosure provide a secondary windscreen directly underneath or near the primary windscreen located at the front of the vehicle. When the secondary windscreen is placed at a lower position than the primary windscreen, the secondary windscreen provides a greater view of the area directly in front of the vehicle, thus eliminating or alleviating the front blind spot of the vehicle and enhancing the visibility of the road for the driver.

The placement of the secondary windscreen beneath the primary windscreen may be a more readily incorporated into electrically powered vehicles (electric vehicles). This is a particularly viable feature for electrically powered vehicles since such vehicles do not require the placement of a bulky engine at the front of the vehicle, consequently freeing up much space and allowing the hood of the vehicle to be dropped lower than most engine powered vehicles. However, it should be noted that the secondary windscreen is not strictly limited for use within electrically powered vehicles, and may even be installed in engine powered vehicles that are designed to accommodate the secondary windscreen below the primary windscreen.

In further embodiments, a secondary windscreen may provide an area for displaying or projecting vehicle information directly onto the window of the secondary windscreen. The area directly above the secondary windscreen may contain a divider that supports and separates the primary windscreen and the secondary windscreen. In such instances, the divider, or also referred to herein as a frame support, may also display vehicle information to the driver operating the vehicle.

Figure 1A:
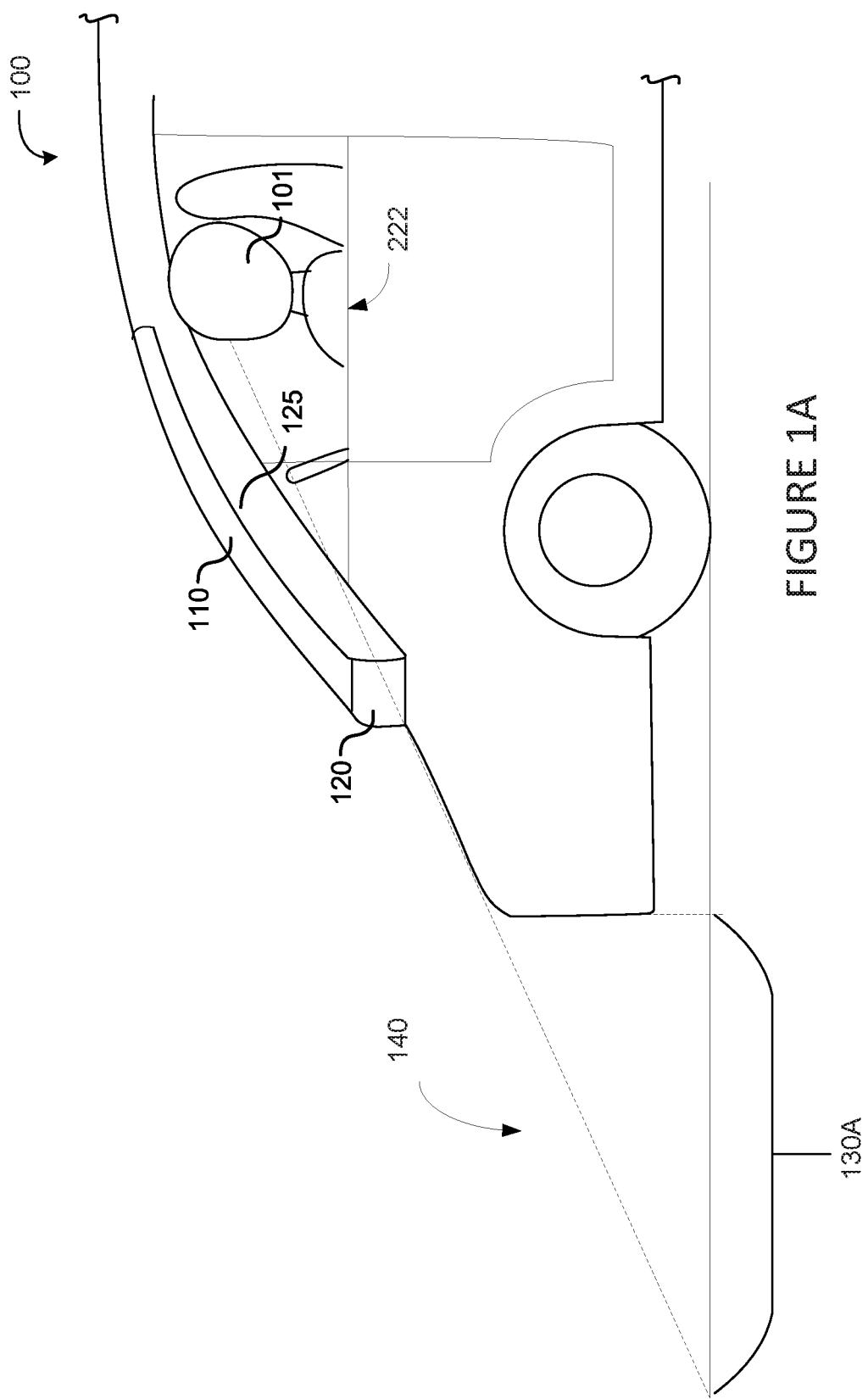
FIG. 1A illustrates a side-view of an exemplary vehicle with a secondary windscreen according to one embodiment.

FIG. 1A illustrates a side-view of an exemplary vehicle 100 with a primary windscreen 110 and a secondary windscreen 120. The primary windscreen 110 may be flat or concave in shape depending on the vehicle design and frame supporting the primary windscreen, such as the A pillar structure supports 125. The secondary windscreen 120, also referred to as an orbit window, may be placed directly beneath the primary windscreen 110, at an angled position with respect to the primary windscreen 110. The primary windscreen 110 and the secondary windscreen 120 provide a driver 101 with two sectional views of a scene in front of the vehicle. For example, while the primary windscreen 110 allows the driver 101 to view the road far ahead of him or her, the placement of the secondary windscreen 120 beneath the primary windscreen 110 may allow the driver 101 to view the road immediately in front or near the front portion of the vehicle, as indicated by line 140, which would have been conventionally concealed from the driver as a part of a front blind spot 130A.

By way of example only, the secondary windscreen 120 may be placed in a substantially vertical standing position underneath the primary windscreen, forming approximately a 120-degree angle between the primary windscreen 110 and secondary windscreen 120, as further depicted in FIG. 1A. In some embodiments, the angle between the primary windscreen 110 and the secondary windscreen 120 is about 85 degrees to 180 degrees. The angle between the primary windscreen 110 and the secondary windscreen 120 may vary depending on vehicle designs. The height of the secondary windscreen may be about 100 mm to 300 mm. In some embodiments, the secondary windscreen 220 can be located below a door line 222 (line separating the door window and the door frame) and that a frame structure (250, which is described in more detail below) between the primary windscreen and the secondary windscreen can be in line or substantially in line with the door line 222.

In some embodiments, the secondary windscreen 120 may be positioned at the same planar surface as the primary windscreen 110, so that the secondary windscreen 120 essentially extends from the primary windscreen 110 to form essentially a 180 degree angle between the primary windscreen 110 and the secondary windscreen 120. At such an instance, it may appear as if the primary windscreen 110 and the secondary windscreen 120 are joined to form a singular windscreen.

Depending upon the angular configuration of the secondary windscreen 120 with respect of the primary windscreen 110, different sections of the road directly in front of the vehicle 100 may be viewable through the secondary windscreen 120. A greater angle where the secondary windscreen 120 is nearly along the same planar surface as the primary windscreen 110, may result in less of the road in the front blind spot 130A to be viewed by the driver 101 sitting in the driver's seat. This is because the surface of the secondary windscreen 120 will generally be facing towards the sky rather than the road immediately in front of the vehicle, allowing for better far reaching visibilities across a far spanning distance than the visibility of the road immediately in front of the vehicle 100. However, a smaller angle between the secondary windscreen 120 and the primary windscreen 110 results in the secondary windscreen 120 to be generally facing the road immediately in front of the vehicle, allowing more of the road conventionally concealed by the front blind spot 130A to be viewed by the driver 101 via the secondary windscreen 120.

Figure 1B:
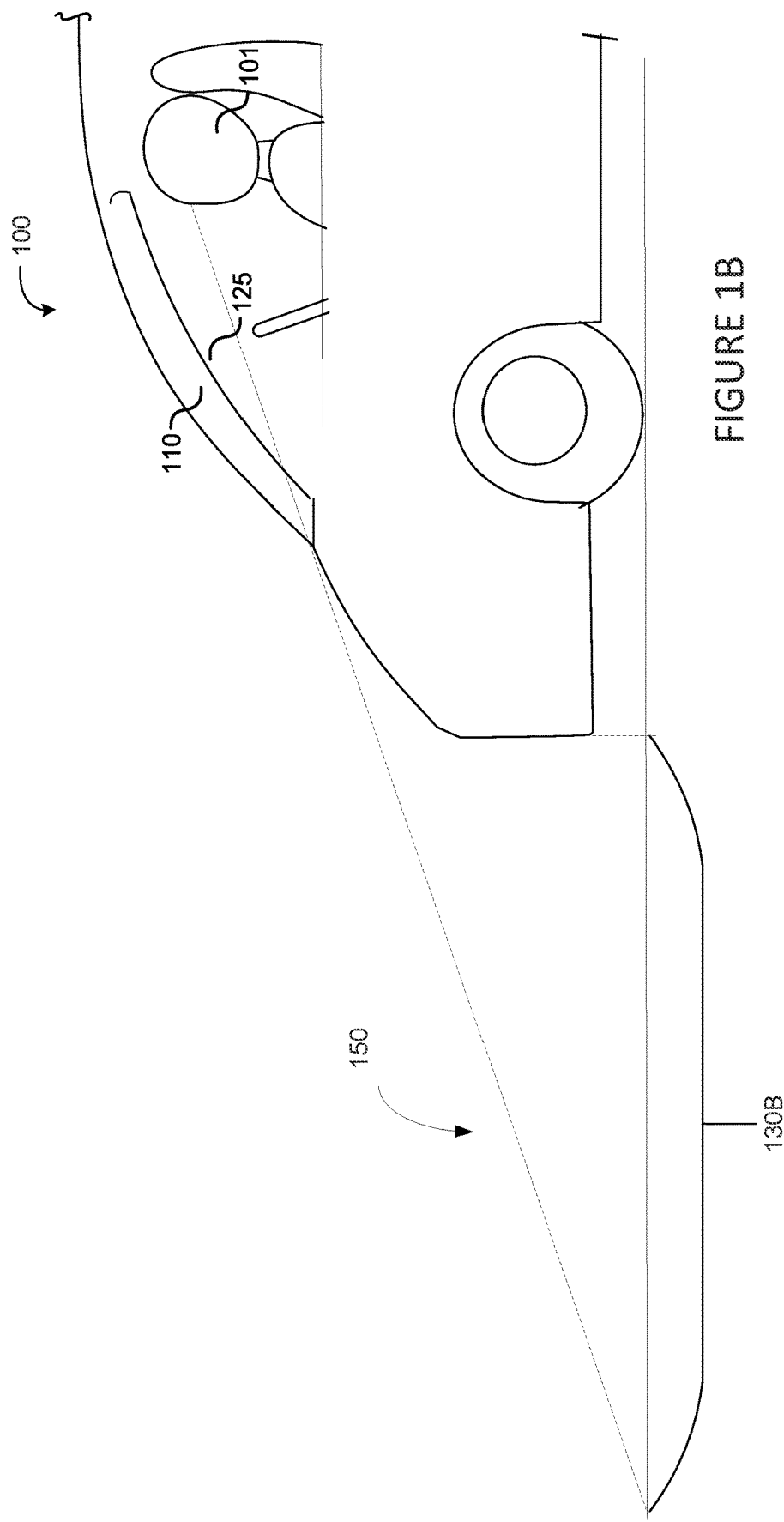
FIG. 1B illustrates a side-view of an exemplary vehicle without a secondary windscreen.

FIG. 1B depicts a vehicle without the secondary windscreen 120. Without a secondary windscreen 120, depending on the type of vehicle model, the closest section of the road that the driver will be able to see from the front end of the vehicle will be a distance of 130B, as indicated at point 150. In such instances without a secondary windscreen 120, the driver's blind spot areas are significantly greater than those vehicles with a secondary windscreen 120 (as indicated by 130A in FIG. 1A). This distance may change upon the height of the primary windscreen 110 as well as other factors, such as length of the front section of the vehicle and the relative height of the driver's seat or vantage point with respect to the ground. Without a secondary windscreen 120 to eliminate or alleviate the front blind spot 130A area, potentially dangerous events may occur, especially when the driver 101 is unaware and unable to see a child or object situated in front of the moving vehicle 100.

Figure 2:
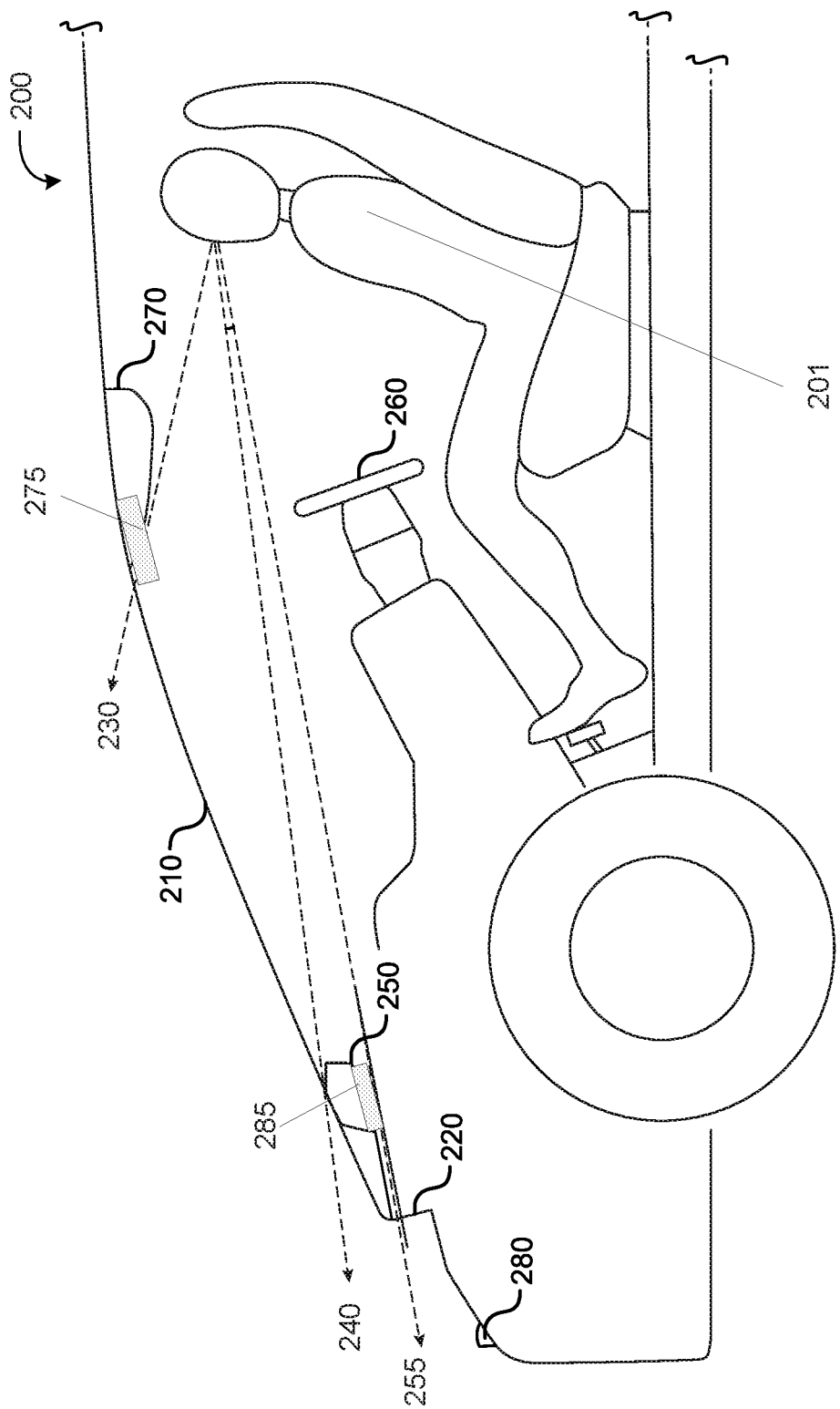
FIG. 2 illustrates interior components of an exemplary vehicle with a secondary windscreen according to one embodiment.

FIG. 2 illustrates interior components of an exemplary vehicle 200 with a secondary windscreen 220 according to one embodiment. As depicted, a driver in the driver's seat is able to view the road and landscape far ahead by looking through a primary windscreen 210. The range in the horizontal sweep or view of the road ahead may be limited by the length of the primary windscreen 210. Additionally, the range in the vertical sweep or view of the road ahead may further be limited by the height of the primary windscreen 210. The driver's highest viewpoint of the landscape ahead is indicated at 230, which is the top most edge of the primary windscreen 210. Additionally, the lowest viewpoint of the landscape ahead through the primary windscreen 210 is indicated at 240, which is the bottom most edge of the primary windscreen 210. Thus, the viewing range of the road or landscape far ahead is limited by what can be viewed through the area between 230 and 240 of the primary windscreen 210.

As shown in FIG. 2, in some embodiments, the secondary windscreen 220 may be placed beneath the primary windscreen 210 to alleviate the poor visibility immediately in front area of the vehicle 200. The secondary windscreen 220 allows the driver to view the road immediately in front of the vehicle 200 that would not have been possible via the primary windscreen 210, such as areas considered to fall within the front blind spot. The vantage viewpoint via the secondary windscreen 220 is indicated at 255, which is lower than the lowest viewpoint of the primary windscreen 210, which is indicated at 240. At such an instance, the driver 201 may be able to tilt his or her line of vision of the road approximately 5 degrees lower as a result of the secondary windscreen 220. The line of vision through the secondary windscreen 220 may range anywhere from 1 to 30 degrees lower from the driver's resting line of vision from the primary windscreen 210, depending on the height of the secondary windscreen 220. By way of example only, the height of the secondary windscreen 220 may range from 100 mm to 300 mm.

In some embodiments, a frame structure 250 is provided between the primary windscreen 210 and the second windscreen 220. The frame structure 250 may provide the necessary framework support and structure for the primary windscreen 210 and secondary windscreen 220 to be securely held in position. Additionally, the use of the frame structure 250 may provide structural relief between the primary windscreen 210 and the second windscreen 220, thus allowing the primary windscreen 210 and the secondary windscreen 220 to be angled at any position relative to the frame structure 250. Also, this allows the primary windscreen 210 and the secondary windscreen 220 to both be relatively flat without requiring the windscreens to be sharp-curved in order to achieve the angle formed by the primary windscreen 210 and the secondary windscreen 220.

In some embodiments, the frame structure 250 may provide a space and area to display vehicle information or other information. The vehicle may include a projector 275 mounted at the reading light compartment area 270 above the driver to project the information on the frame structure 250. In some other embodiments, the frame structure may include a display, for example, a curved OLED, for displaying vehicle information or other information. By way of example only, vehicle information presented or displayed may include a speedometer, fuel gauge, tachometer, charging system gauge, oil pressure gauge, oil pressure gauge, temperature gauge, GPS, and the like. In other embodiments, the frame structure 250 may be covered with a screen. The vehicle information may be projected onto the screen.

The vehicle may further include a camera 280 attached on the front area of the vehicle. For example, the camera 280 may be attached to the areas of the A pillar structure, the front bumper, or the front section of the roof top. In some embodiments, the projector 275 may be operatively coupled to the camera 280 to receive the images and project the images onto the screen on the frame structure 250. In other instances, the camera 280 may record the images so that the driver may view the images at a later time. In some embodiments, the camera 280 may be configured to capture images of a part of the scene that is otherwise blocked by the frame structure 250, and when the images are projected on the screen, the views from the first and second windscreens and the images form a continuous view of the scene in front of the vehicle. In some embodiments, the vehicle information can be projected, displayed, or transposed on the top of the captured and displayed images.

In some embodiments, the frame structure 250 may have one or more demister grilles having vents located along the demister grille. The vents may be coupled to a ventilation system, such as ducts. The vents provide for hot or cool air to be circulated around the primary windscreen 210 and the secondary windscreen 220. The incoming air from outside can be heated by the engine to keep the windows of the primary windscreen 210 and the secondary windscreen 220 clear of mist when the temperature outside is significantly different from the cabin temperature of the vehicle.

In some embodiments, vehicle information may be projected and displayed onto the secondary windscreen 220. The projector may be a handheld projector, also known as a pocket projector, mobile projector, pico projector, or a mini beamer to display the appropriate vehicle information on the secondary windscreen 220. In some instances, the projector may be located above the driver's head at 275, or mounted beneath the frame structure 250 at 285. Exemplary vehicle information that may be presented or displayed may include a speedometer, fuel gauge, tachometer, charging system, gauge oil, oil pressure gauge, oil pressure gauge, temperature gauge, GPS, and like.

The secondary windscreen 220 may be made of anti-glare glass or other material that prevents the window from glaring when sunlight or other sources of light, such as headlights and traffic lights, strike the secondary windscreen 220. The secondary windscreen 220 may also be tinted so that the information displayed on the secondary windscreen 220 is easily and readily viewable by the driver during the day time. In some embodiments, the secondary windscreen 220 may be opaque, translucent, or transparent. In some instances, the secondary windscreen 220 may include electrochromic glass or other type of glass that can change color and/or transmittance or translucency. The secondary windscreen 220 may feature different visual qualities depending on the operating mode of the secondary windscreen 220. For example, when the secondary windscreen 220 is currently not displaying any information and is being used by the driver to view the area or road in front of the vehicle 200, the secondary windscreen 220 may be clear or transparent to equip the driver with the most clear and best visibility quality of the road ahead. In instances where the secondary windscreen 220 has vehicle information projected onto it, the secondary windscreen 220 may then transition into a tinted or opaque quality so that information displayed on the secondary windscreen 220 is better visible to the driver or passengers.

In other embodiments, a screen may be placed over the secondary windscreen 220. The screen may also be made of anti-glare film or screen material so that the vehicle information is easily visible to the driver even when sunlight or other light sources strikes the screen. The projector 275, 285 may project the information onto the screen of the secondary windscreen 220. The screen may be rolled or stored beneath the secondary windscreen 220 or hidden elsewhere from the driver's view until needed, allowing the driver 201 to view the road through the secondary windscreen 220 when the screen is not in use.

Figure 3:
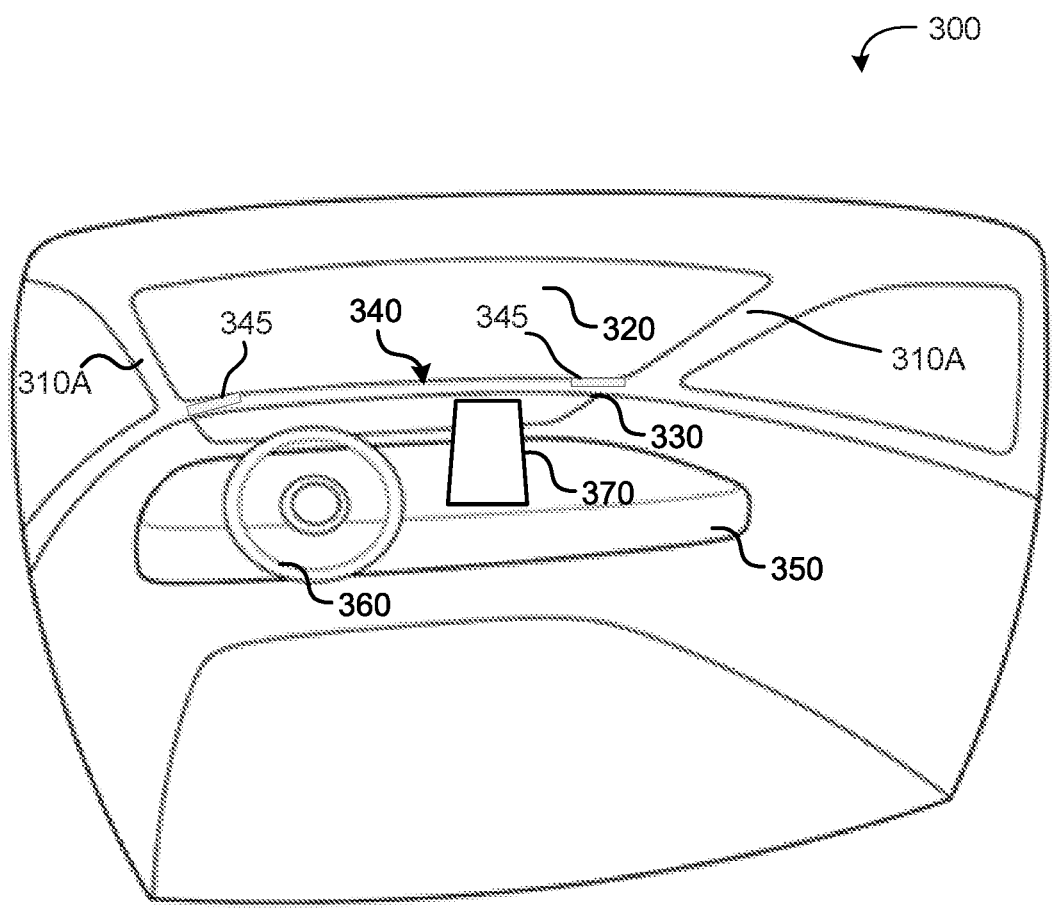
FIG. 3 illustrates an interior cabin of an exemplary vehicle with a secondary windscreen from a driver's perspective according to one embodiment.

FIG. 3 illustrates a vehicle cabin 300 viewed from inside of the vehicle. As shown in FIG. 3, the vehicle cabin 300 includes a primary windscreen 320 between two A-pillars 310A, a secondary windscreen 330 beneath the primary windscreen 320, and a support structure 340 between the primary windscreen 320 and the secondary windscreen 330. The support structure 340 supports and securely holds the primary windscreen 320 and the secondary windscreen 330. The support structure 340 may include demister grille 345 and ducts within the support structure 340. The ducts are in fluid communication with the demister grille 345.

The vehicle cabin 300 may further include a dashboard 350 and a steering wheel 360. The dashboard 350 may be leveled so that it is flat and not higher than the steering wheel 360. The dashboard 350 may be low in order to prevent it from obstructing views through the secondary windscreen 330. The vehicle information may be displayed or projected onto the frame structure 340 and/or the secondary windscreen 330, as described in detail above. This may also be a safer alternative to display vehicle information since the information is more closely displayed along the driver's line of sight of the road ahead. In some instances, the dashboard 350 may be an extension of the exterior hood of the vehicle. For example, the dashboard 350 frame and cover may be formed from the same material and/or has the same color as the exterior hood of the vehicle, so that the dashboard 350 and the hood look like a continuous, seamless, and integrated surface.

In other instances, a display screen 370 may be separately placed next to the steering wheel to the right of the driver to provide information to the driver. The display screen 370 may provide multimedia information as well as setting configurations for the vehicle, such as driving settings, cabin control settings, vehicle information, GPS, and the like. The vehicle information may be split amongst the frame structure 340, secondary windscreen 330, and the display screen 370.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A vehicle windscreen assembly comprising:
   a first windscreen at a front section of a vehicle; and
   a second windscreen positioned beneath and at an angled position with the first windscreen,
   wherein the second windscreen reduces a driver's blind spot area in front of the vehicle, and
   wherein the second windscreen comprises a screen for displaying information.

2. The vehicle windscreen assembly of claim 1, wherein the first windscreen and the second windscreen provide the driver with two sectional views of a scene in front of the vehicle.

3. The vehicle windscreen assembly of claim 1, wherein the second windscreen is substantially vertical to the ground.

4. The vehicle windscreen assembly of claim 1, further comprising a frame structure positioned between the first windscreen and the second windscreen to support and securely hold the first windscreen and the second windscreen.

5. The vehicle windscreen assembly of claim 4, wherein the frame structure comprises a demister grille.

6. The vehicle windscreen assembly of claim 5, wherein the frame structure comprises ducts in fluid communication with the demister grille.

7. The vehicle windscreen assembly of claim 4, further comprising a screen configured to be placed on the frame structure for displaying information.

8. The vehicle windscreen assembly of claim 7, further comprising a projector to project the information onto the screen.

9. The vehicle windscreen assembly of claim 8, wherein the projector is placed underneath the frame structure.

10. The vehicle windscreen assembly of claim 7, further comprising a camera attached to the vehicle to capture images of a scene in front of the vehicle and a projector operatively coupled to the camera to receive the images and project the images onto the screen.

11. The vehicle windscreen assembly of claim 9, wherein the camera is configured to capture images of a part of the scene that is otherwise blocked by the frame structure, and when the images are projected on the screen, the views from the first and second windscreens and the images form a continuous view of the scene in front of the vehicle.

12. A vehicle windscreen assembly comprising:
    a first windscreen at a front section of a vehicle;
    a second windscreen positioned beneath the first windscreen;
    a frame structure positioned between the first windscreen and the second windscreen to support and securely hold the first windscreen and the second windscreen; and
    a screen configured to be placed on the frame structure for displaying information,
    wherein the second windscreen reduces a driver's blind spot area in front of the vehicle.

13. The vehicle windscreen assembly of claim 12, wherein the first windscreen and the second windscreen form an angle ranging from 85 degrees to 180 degrees.

14. The vehicle windscreen assembly of claim 12, wherein the second windscreen is substantially vertical to the ground.

15. The vehicle windscreen assembly of claim 12, wherein the first windscreen and the second windscreen provide the driver with two sectional views of a scene in front of the vehicle.

16. The vehicle windscreen assembly of claim 12, wherein the frame structure comprises a demister grille.

17. A vehicle comprising:
    a first windscreen at a front section of the vehicle;
    a second windscreen positioned beneath the first windscreen; and
    a frame structure positioned between the first windscreen and the second windscreen to support and securely hold the first windscreen and the second windscreen; and
    a screen configured to be placed on the frame structure for displaying information,
    wherein the second windscreen reduces a driver's blind spot area in front of the vehicle.

18. The vehicle of claim 17, wherein the vehicle is an electric vehicle.

* * * * *